US010699251B2

(12) United States Patent
Zimmermann et al.

(10) Patent No.: US 10,699,251 B2
(45) Date of Patent: *Jun. 30, 2020

(54) SERVICE SCHEDULING SYSTEM

(71) Applicant: SONY CORPORATION, Tokyo (JP)

(72) Inventors: Klaus Zimmermann, Neckartenzlingen (DE); Aurel Bordewieck, Kirchheim unter Teck (DE)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/167,255

(22) Filed: Oct. 22, 2018

(65) Prior Publication Data
US 2019/0057359 A1 Feb. 21, 2019

Related U.S. Application Data

(63) Continuation of application No. 14/178,689, filed on Feb. 12, 2014, now Pat. No. 10,115,078.

(30) Foreign Application Priority Data

Mar. 11, 2013 (EP) .................................... 13001208

(51) Int. Cl.
G06Q 10/00 (2012.01)
G06Q 10/10 (2012.01)
G06Q 50/10 (2012.01)

(52) U.S. Cl.
CPC ......... G06Q 10/1095 (2013.01); G06Q 50/10 (2013.01)

(58) Field of Classification Search
CPC ........................ G06Q 10/1095; G06Q 50/10
See application file for complete search history.

(56) References Cited

U.S. PATENT DOCUMENTS 5,113,380 A 5/1992 Levine
6,345,260 B1* 2/2002 Cummings, Jr. ..... G06F 19/327
705/7.19

(Continued)

FOREIGN PATENT DOCUMENTS

CN 101044533 9/2007
CN 101903873 12/2010

OTHER PUBLICATIONS

"Self-Organized Scheduling in Hospitals by Connecting Agents and Mobile Devices", T Eymann, G Müller, M Strasser—Multiagent Engineering, 2006—Springer (Year: 2006).*

(Continued)

*Primary Examiner* — Jonathan G Sterrett
(74) *Attorney, Agent, or Firm* — Xsensus LLP

(57) ABSTRACT

A service scheduling system (1) is configured to retrieve schedule information from a time-management system (2) of a service provider, whereat the schedule information assigns service intervals offered by the service provider to a plurality of clients. The service scheduling system (1) comprises a detector (13) configured to detect an event indicating that a client cannot be served in a first service interval assigned to said client according to the schedule information. The service scheduling system (1) further comprises a transmitter configured to transmit, to a communication terminal (3') of a further client, information specifying a second service interval which is at least partly overlapping the first service interval, and a receiver configured to receive, from the communication terminal (3') of the further client, acknowledgment information indicating that the further client agrees to get served in the second service interval.

11 Claims, 4 Drawing Sheets

(56) References Cited

U.S. PATENT DOCUMENTS

| | | | |
|---|---|---|---|
| 6,760,412 B1* | 7/2004 | Loucks | H04M 3/42 379/207.03 |
| 7,188,073 B1* | 3/2007 | Tam | G06Q 10/02 705/5 |
| 7,689,441 B1* | 3/2010 | Craft | G06F 19/327 600/300 |
| 7,693,735 B2 | 4/2010 | Carmi et al. | |
| 8,244,566 B1 | 8/2012 | Coley et al. | |
| 8,311,513 B1* | 11/2012 | Nasserbakht | G06Q 10/109 455/410 |
| 2001/0026609 A1 | 10/2001 | Weinstein | |
| 2002/0010610 A1 | 1/2002 | Jacobs | |
| 2002/0035493 A1 | 3/2002 | Mozayeny | |
| 2002/0040305 A1 | 4/2002 | Nakatsuchi | |
| 2002/0196280 A1 | 12/2002 | Bassett | |
| 2003/0005124 A1* | 1/2003 | Hollinger | G06Q 10/02 709/226 |
| 2003/0014297 A1 | 1/2003 | Kaufman | |
| 2003/0046304 A1 | 3/2003 | Peskin et al. | |
| 2003/0078833 A1 | 4/2003 | Suzuki | |
| 2004/0039626 A1* | 2/2004 | Voorhees | G06Q 10/02 705/7.19 |
| 2004/0059618 A1* | 3/2004 | Ford | G06Q 10/20 705/305 |
| 2004/0108711 A1 | 6/2004 | Nikodem | |
| 2004/0193458 A1* | 9/2004 | Bear | G06Q 10/109 705/5 |
| 2004/0243266 A1 | 12/2004 | Mata | |
| 2006/0111955 A1* | 5/2006 | Winter | G06Q 10/06 705/7.19 |
| 2006/0161468 A1* | 7/2006 | Larsen | G06Q 10/06311 705/80 |
| 2007/0214228 A1* | 9/2007 | Horvitz | G06Q 10/107 709/207 |
| 2007/0282656 A1 | 12/2007 | Battcher et al. | |
| 2008/0167938 A1* | 7/2008 | Meisels | G06Q 10/063116 705/7.16 |
| 2008/0249830 A1* | 10/2008 | Gilman | G06Q 10/063116 705/7.16 |
| 2009/0138283 A1* | 5/2009 | Brown | G06Q 10/109 705/3 |
| 2009/0222747 A1* | 9/2009 | May | G06Q 10/109 715/764 |
| 2010/0070295 A1* | 3/2010 | Kharraz Tavakol | G06Q 10/02 705/2 |
| 2010/0070296 A1* | 3/2010 | Massoumi | G06Q 50/22 705/2 |
| 2010/0070297 A1* | 3/2010 | Kharraz Tavakol | G06Q 10/10 705/2 |
| 2010/0082391 A1* | 4/2010 | Soerensen | G06Q 10/1095 705/7.19 |
| 2010/0124937 A1* | 5/2010 | Vogel | G06Q 30/02 455/466 |
| 2010/0153162 A1 | 6/2010 | Tam et al. | |
| 2010/0153487 A1* | 6/2010 | Greven | G06Q 10/06311 709/203 |
| 2010/0198646 A1* | 8/2010 | Mikan | G01C 21/3438 705/7.16 |
| 2010/0269049 A1* | 10/2010 | Fearon | G06Q 10/109 715/744 |
| 2011/0029370 A1 | 2/2011 | Roeding | |
| 2011/0161227 A1* | 6/2011 | Santo, Jr. | G06Q 10/10 705/40 |
| 2011/0215933 A1 | 9/2011 | Darling | |
| 2011/0283218 A1* | 11/2011 | Schwendimann | G06Q 10/109 715/772 |
| 2012/0030194 A1* | 2/2012 | Jain | G06F 3/0481 707/722 |
| 2015/0220606 A1* | 8/2015 | Ito | G06Q 50/10 707/722 |
| 2015/0242819 A1* | 8/2015 | Moses | G06Q 10/04 705/7.19 |

OTHER PUBLICATIONS

Time and money: effects of no-shows at a family practice residency clinic CG Moore, P Wilson-Witherspoon . . .—Family Medicine-Kansas . . . , 2001—researchgate.net (Year: 2001).*

EMIKA-Real-Time Controlled Mobile Information Systems in Health Care Applications. S Sackmann, T Eymann, G Müller—Mobile Computing in Medicine, 2002—Citeseer (Year: 2002).*

Improving patient activity schedules by multi-agent pareto appointment exchanging I Vermeulen, S Bohte, K Somefun . . .— . . . Technology, 2006. The . . . , 2006—ieeexplore.ieee.org (Year: 2006).*

"Rescheduling Dental Care with GSM-Based Text Messages", R Suomi, A Serkkola—Web Mobile-Based Applications for . . . , 2007—igi-global.com (Year: 2007).*

Search Report and Office Action issued in Chinese Application 201410088330.0 dated Aug. 7, 2018.

Combined Chinese Office Action and Search Report dated Dec. 4, 2017 in Patent Application No. 201410088330.0.

"Rescheduling Dental Care with GSM-Based Text Messages", R Suomi, A Serkkola—Web Mobile-Based Applications for . . . , 2007—igi-global.com.

"Self-Organized Scheduling in Hospitals by Connecting Agents and Mobile Devices", T Eymann, G Muller, M Strasser—Multiagent Engineering, 2006—Springer.

Time and money: effects of no-shows at a family practice residency clinic CG Moore, P Wilson-Witherspoon . . .—Family Medicine-Kansas . . . , 2001—researchgate.net.

EMIKA-Real-Time Controlled Mobile Information Systems in Health Care Applications. S Sackmann, T Eymann, G Muller—Mobile Computing in Medicine, 2002—Citeseer.

Ivan Vermeulen, et al., "Improving patient activity schedules by multi-agent pareto appointment exchanging", Proceedings of the 8th IEEE International Conference on E-Commerce Technology and the 3rd IEEE, International Conference on Enterprise Computing, E-Commerce, and E-Services, 2006, ieeexplore.ieee,org.

Doug Wightman, et al., "TimePres : Creating a Specialized Dynamic Calendar", Stanford University, Jun. 22, 2006, 2 pages.

Kühnel, B., et al., "Schedule Your Buddies—Collaborative Work Needs Peer-to-Peer Calendar-Coordination", Thomson Reuters, PANGEA3, Oct. 2005 (reference not available, submitting English Abstract only).

\* cited by examiner

SERVICE SCHEDULING SYSTEM

BACKGROUND

Field of the Disclosure

The present disclosure relates to a service scheduling system and a corresponding method. Specifically, the present disclosure relates to a system and method for scheduling services offered by a service provider to a plurality of clients.

Description of Related Art

Presently appointment scheduling at a service provider such as e.g. a dentist, a doctor, a hairdresser or the municipality is a relatively static process. Typically, an employee of the service provider checks a digital or paper calendar for suitable, free time slots and makes an appointment suggestion to the client who himself checks whether the suggested date and time suits his personal schedule.

Once a match is found, both parties agree on the appointment time and usually it is the client's responsibility to make sure he blocks the appointment time in his personal schedule, e.g. by adding a respective note to his calendar. All the service provider can do to assure the client actually takes a note of the appointment is handing out a small paper card etc. on which the appointment is noted. In most cases, the process ends here and the service provider must rely on the client to actually show up at the agreed appointment time.

In some cases, in which a non-appearance or an off-time appearance of the client would lead to significant disturbance of operations and result in considerable financial loss, service providers contact their clients shortly ahead of the appointment to make sure they show up. Although this is a considerable administrative effort it is for instance being done by orthodontists and dentists in order to assure a steady utilization of their resources.

In the case of doctors, dentists or orthodontists, but also other service providers, a non-appearance can result in significant economic loss as they often have to dedicate a considerable amount of (human) resources and time to a single treatment of a single client. In the case of orthodontists, for instance, the issue is particularly serious because they usually deal with young adults and children who tend to be less reliable in keeping appointments than adults.

From a client perspective, waiting is an annoying routine. In most cases, in which a client arrives perfectly on the time that was agreed upon, he has to wait. The main reasons for this condition are that it is often difficult to precisely plan a treatment and that service providers usually do not take into account unforeseen events or factors that might delay the service. Service providers want to assure continuous operations and a steady "supply" of clients over the day. In order to assure this uninterrupted service, service providers accept a certain waiting time for their clients who then waste valuable life and work time as usually the waiting time cannot be bridged with productive activities.

SUMMARY

The above problems are solved by a system, a method and a computer program according to the independent claims.

Further details of the invention will become apparent from the consideration of the drawings and the ensuing description.

A service scheduling system is configured to retrieve schedule information from a time-management system of a service provider, the schedule information assigning service intervals offered by the service provider to a plurality of clients. The service scheduling system comprises a detector configured to detect an event indicating that a client cannot be served in a first service interval assigned to said client according to the schedule information. The service scheduling system further comprises a transmitter configured to transmit, to a communication terminal of a further client, information specifying a second service interval which is at least partly overlapping the first service interval. Moreover, the service scheduling system comprises a receiver configured to receive, from the communication terminal of the further client, acknowledgment information indicating that the further client agrees to get served in the second service interval.

Furthermore, a service scheduling method comprises retrieving, from a time-management system of a service provider, schedule information assigning service intervals offered by the service provider to a plurality of clients, detecting an event indicating that a client cannot be served in a first service interval assigned to said client according to the schedule information, transmitting, to a communication terminal of a further client, information specifying a second service interval which is at least partly overlapping the first service interval, and receiving, from the communication terminal of the further client, acknowledgment information indicating that the further client agrees to get served in the second service interval. Moreover, a computer program is claimed, wherein the computer program controls one or more processors of a service scheduling system such that the service scheduling system performs the above-mentioned steps.

The foregoing paragraphs have been provided by way of general introduction, and are not intended to limit the scope of the following claims. The described embodiments, together with further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
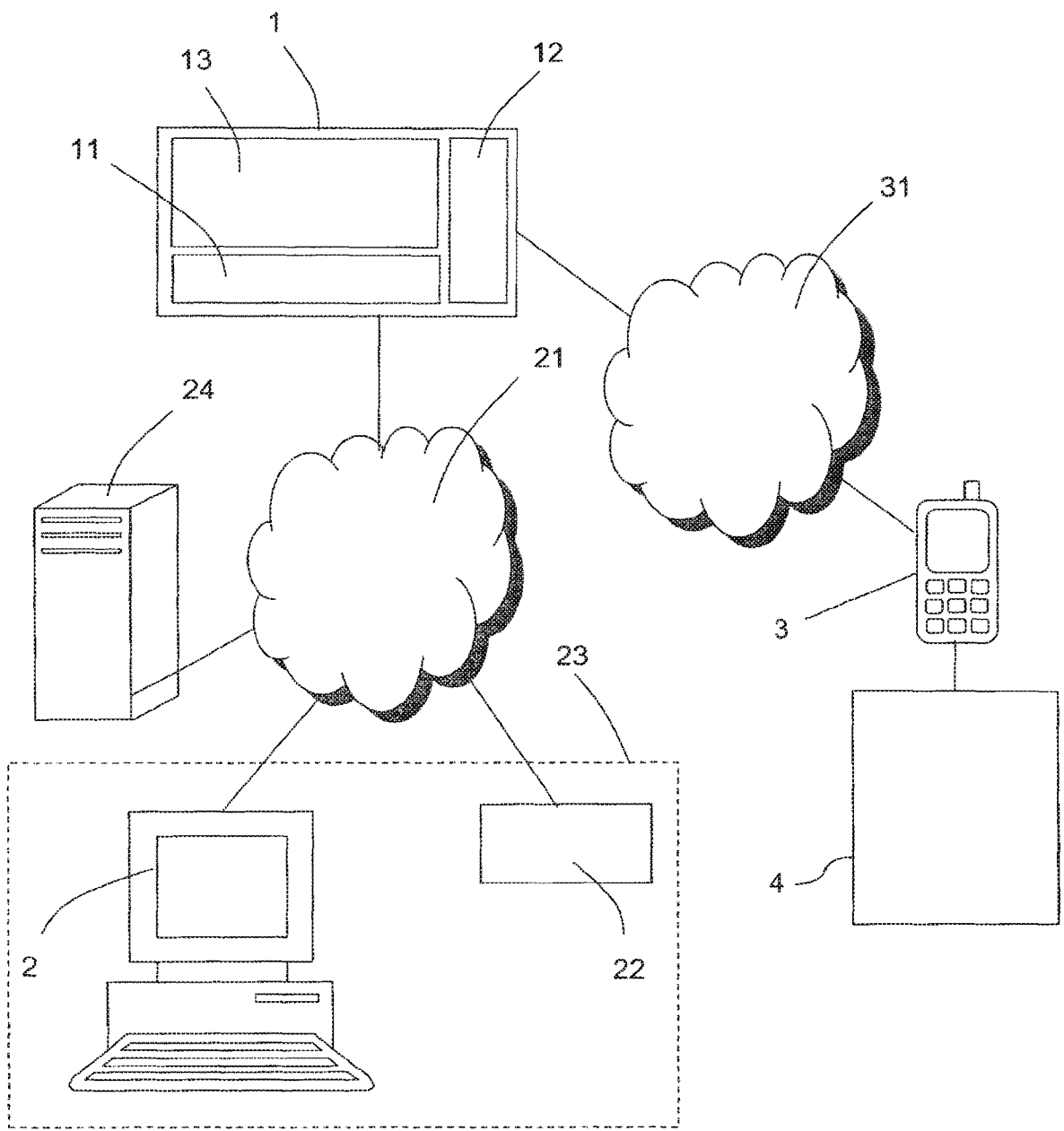
FIG. 1 illustrates an exemplary application scenario of a service scheduling system.

Referring now to the drawings, wherein like reference numerals designate identical or corresponding parts throughout the several views, FIG. 1 illustrates an embodiment of a service scheduling system 1.

As illustrated in FIG. 1, the service scheduling system 1 forms an interface between a time-management system 2 of a service provider and a communication terminal 3 of a client and his time management system 4. The service scheduling system 1 comprises a service provider communication interface 11 for communicating with the time-management system 2 of the service provider via a first communication network 21 or via a direct communication link. The service scheduling system 1 further comprises a client communication interface 12 for communicating with the communication terminal 3 of the client via a second communication network 31 or via a direct communication link.

The service provider is a person or organization which offers a service during a time period to one or more clients. The service provider may be e.g. a dentist, a doctor, or a hairdresser. In general, a service provider may offer an arbitrary service during the time period, which will be denoted service interval in the following.

The time-management system 2 of the service provider stores and manages schedule information. The schedule information assigns service intervals to a plurality of clients, wherein in each service interval a specific service is offered by the service provider to a specific client. In other words, the schedule information comprises both information related to a client and information related to a service interval. The information related to the client may include e.g. the client's name, address, e-mail address, telephone number, etc. On the other hand, the information related to the service interval may comprise e.g. a start time and/or an end time of the service interval, a description of the particular service offered during the service interval, and resources of the service provider required for providing the service. Said resources may include e.g. treatment rooms, consulting rooms, staff, machines, material and preparation time of the service provider.

The time-management system 2 of the service provider may comprise a calendaring software for storing and managing the schedule information. The calendaring software may be any kind of digital calendar which is e.g. integrated in an e-mail software, Personal Information Manager (PIM), operating system or any kind of branch-specific software solution. Examples for calendaring software include but are not limited to: Microsoft® Outlook®, Apple® iCal®, Lightning® for Mozilla® Thunderbird®, Mozilla® Sunbird® or other calendaring software using the iCalendar format.

As illustrated in FIG. 1, the time-management system 2 may comprise calendaring software which is installed or implemented on a computer system of the service provider. In this case of "offline" calendaring software, the schedule information is stored e.g. on the computer system of the service provider or on another storage device within a local area network (LAN) of the service provider. Moreover, the time-management system 2 may also comprise "online" calendaring software embodied as time-management web applications such as e.g. Google Calendar, Now Up-to-Date & Contact® by Now Software® or other time-management web applications included e.g. in social networks. In case of such web applications, the schedule information may be stored e.g. on a network server 24 and the time-management system 2 of the service provider, i.e. the application running on the computer system of the service provider may access the schedule information by accessing the network server 24. The time-management system 2 of the service provider may be connected with the network server 24 via the first communication network 21 or via another network.

The time-management system 4 of the client may as well comprise software which is installed or implemented on a computer system of the client or the communication terminal 3. In case of "offline" calendaring software, schedule information is stored e.g. on the computer system of the client or on another storage device within a local area network (LAN) of the client. Moreover, the time-management system 4 may also comprise "online" calendaring software embodied as time-management web applications such as e.g. Google® Calendar, Now Up-to-Date & Contact® by Now Software® or other time-management web applications included e.g. in social networks. In case of such web applications, the schedule information may be stored e.g. on a network server and the time-management system 4 of the client, e.g. the application running on the communication terminal 3 of the client may access the schedule information by accessing the network server. The time-management system 4 of the client may be connected with the network server via the first communication network 21 or via another network.

The first communication network 21 may be a fixed line communication network, a mobile communication network or a combination of both. Specifically, the first communication network 21 may be the Internet.

As already mentioned, the service scheduling system 1 includes a service provider communication interface 11 for enabling data exchange with the time-management system 2 via the first communication network 21 or via a direct communication link, A direct communication link may be applied e.g. in case the service scheduling system 1 is located within the premises 23 of the service provider. The direct communication link may comprise e.g. a simple cable for connecting the service scheduling system 1 with the computer system or network of the service provider.

Alternatively, the service scheduling system 1 may be connected with the time-management system 2 via the first communication network 21. In this case, the service provider communication interface 11 is, dependent on the type of the first communication network 21, configured to transmit data to and/or to receive data from the time-management system 2.

The data exchanged between the service management system 1 and the time-management system 2 includes e.g. the schedule information. Optionally, the service provider communication interface 11 is configured to synchronize schedule information stored in a data storage of the service scheduling system 1 with the schedule information stored in the time-management system 2.

Access to the time-management system 2 of the service provider may be secured e.g. by means of login information and a password. To this end, the service provider communication interface 11 may be configured to carry out an access procedure before exchanging data with the time-management system 2.

The service management system 1 comprises a processing system which is connected to both the service provider communication interface 11 and the client communication interface 12. The processing system in accordance with this disclosure can be implemented using a microprocessor or its equivalent, such as a central processing unit (CPU) or at least one application specific processor (ASP). The microprocessor utilizes a computer readable storage medium, such as a memory (e.g., ROM, EPROM, EEPROM, flash memory, static memory, DRAM. SDRAM, or their equivalents), configured to control the microprocessor to perform and/or control the processes of this disclosure. Other storage mediums can be controlled via a controller, which can control a hard disc drive or an optical disk drive.

The microprocessor or aspects thereof, in an alternate embodiment, can include or exclusively include a logic device for augmenting or fully implementing this disclosure, Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU.

The communication terminal 3 of the client may be e.g. a smart phone, a cell phone, a personal digital assistant (PDA), an internet connected computer, or a wireless pager.

The second communication network 31 may be a fixed line communication network, a mobile communication network, or a combination of both. The second communication network 31 may or may not be the same network as the first communication network 21. In particular, the second communication network 31 may be the Internet or a mobile communication network compliant to standards such as GSM (Global System for Mobile Communication), UMTS (Universal Mobile Telecommunication System), Long Term Evolution (LTE) or LTE-Advanced.

For enabling data exchange with the communication terminal 3 of the client via the second communication network 31, the service scheduling system 1 includes the client communication interface 12 which is configured to transmit data to and/or to receive data from the communication terminal 3. Dependent on the type of the second communication network 31, the client communication interface 12 comprises respective communication modules. For example, in case the communication terminal 3 of the client is capable of communicating via a mobile communication network 31, the client communication interface 12 comprises a communication module suitable for the respective mobile communication standard.

Figure 2:
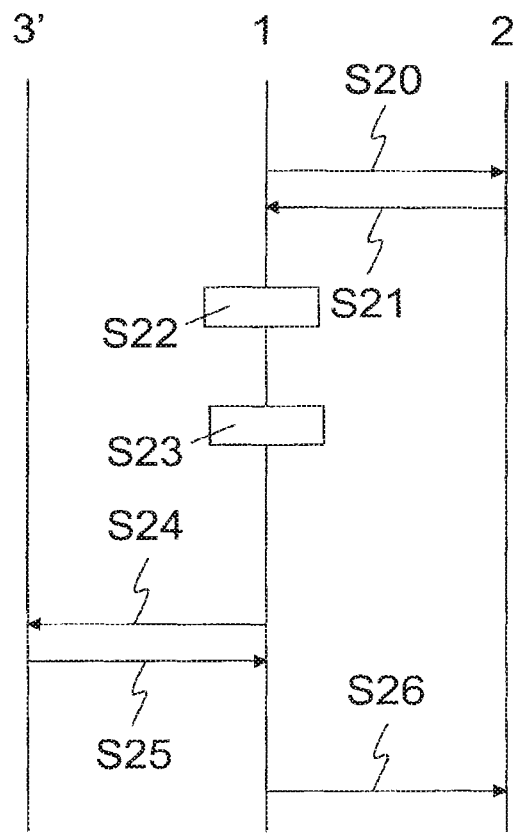
FIG. 2 shows a flow diagram illustrating an exemplary sequence of steps carried out by the service scheduling system.

FIG. 2 shows a flow diagram illustrating an exemplary sequence of steps carried out by the service scheduling system 1. The service scheduling system 1 may be configured to retrieve schedule information from the time-management system 2 of the service provider (step S21), the schedule information assigning service intervals offered by the service provider to a plurality of clients. The service scheduling system 1 may comprise a detector 13 configured to detect an event indicating that a client cannot be served in a first service interval assigned to said client according to the schedule information (step S22). The service scheduling system 1 may comprise a transmitter configured to transmit, to a communication terminal 3' of a further client, information specifying a second service interval which is at least partly overlapping the first service interval (step S24). Moreover, the service scheduling system 1 may comprise a receiver configured to receive, from the communication terminal 3' of the further client, acknowledgment information indicating that the further client agrees to get served in the second service interval.

Both the transmitter and the receiver may be included in the service scheduling system's 1 client communication interface 12. In the following, to simplify the discussion, the further client will be simply denoted as the replacement client. The communication terminal 3 of the replacement client is referenced as communication terminal 3'.

In optional step S20, the service scheduling system 1 may transmit a request for schedule information to the time-management system 2 of the service provider. In this so-called pull-mode, in step S21, the schedule information is transmitted by the time-management system 2 upon request of the service scheduling system 1.

Alternatively, in the so-called push-mode, the service scheduling system 1 receives schedule information proactively transmitted by the time-management system 2, i.e., the optional step S20 may be omitted. In any case, however the service scheduling system 1 is configured to retrieve schedule information from the time-management system 2.

In step S21, the schedule information stored at the time-management system 2 is not necessarily completely received by the service scheduling system 1. In other words, in step S21, only single information elements of the schedule information like e.g. new information elements or information elements which have changed recently may be transmitted by the time-management system 2. In general, the steps S20 and S21 represent a synchronization process for synchronizing schedule information stored at the service scheduling system 1 with schedule information stored at the time-management system 2. Therefore, a person skilled in the art understands that updated schedule information may be retrieved by the service scheduling system 1 in a different way as described with regard to steps S20 and S21.

In step S22, the detector 13 is configured to detect that it is not possible that the client receives the service during the first service interval, although said client has previously agreed with the service provider to get served during said first service interval and this agreement is reflected in the schedule information such that the first service interval is assigned to said client. In other words, the detector 13 is configured to monitor events related to those clients to whom a service interval has been assigned according to the schedule information. The detector 13 may be embodied as a software module running on the processing system of the service scheduling system 1 or as a dedicated hardware/software unit.

The detector may be configured to detect an event indicating the physical absence of the client or of the communication terminal 3 of the client at the premises 23 of the service provider. This event may be generated e.g. by a client sensor 22 which is located at the premises 23 of the service provider and configured to collect real-time information indicating the physical presence and/or absence of a client at the premises 23 of the service provider. The client sensor 22 may be comprised in the service scheduling system 1 or may be an external device. In any way, the client sensor 22 is configured to communicate with the service scheduling system 1, in particular with the detector 13 of the service scheduling system 1, via a communication network or via a direct (wired or wireless) communication link. As illustrated in FIG. 1, a client sensor 22 at the premises 23 of the service provider may be connected with the service scheduling system 1 via the first communication network 21.

The detector 13 may detect that the client does not show up within a predetermined time limit after the intended start time of the first service interval. To this end, e.g. video cameras, weight sensors, contact sensors, or other kinds of sensors may be used as client sensors 22. For example, in case the service provider is a dentist, the client sensor 23 for detecting the physical presence of the client may be integrated e.g. in a dentist chair.

Alternatively or additionally, the client sensor 22 may comprise a wireless receiver for receiving an electromagnetic signal emitted by the communication terminal 3 of the client. The wireless receiver may be e.g. located at the reception desk of a doctors office and may be configured to receive a near field communication (NFC) signal emitted by the communication terminal 3 of a client. Moreover, the wireless receiver may be configured to receive other kinds of wireless signals, like e.g. radio frequency identification (RFID) signals, or signals based on an IEEE 802 standard such as ZigBee, Bluetooth or WLAN. In any way, the detector 13 detects an event indicating the physical absence of the communication terminal 3 of the client provided that no wireless signal is detected by the wireless receiver of the client sensor 22.

The detector 13 may be configured to detect an event that the service scheduling system 1 receives a cancellation message. The service cancellation message may be e.g. transmitted by the client via the communication terminal 3 and may be received by the client communication interface 12 of the service scheduling system 1. The cancellation message may be e.g. an e-mail or a short text message (SMS) with a predetermined content or another predetermined electronic message which is transmitted via the second communication network 31. The client may initiate transmission of the service cancellation message to indicate that he plans not to attend the upcoming service during said first service interval.

On the other hand, the cancellation message may be transmitted by the service provider via the time-management system 2 and may be received by the service provider communication interface 11 of the service scheduling system 1. The service provider 3 or staff of the service provider 3 may initiate transmission of the service cancellation message after a telephone or personal communication with the client, or after having received an e-mail or a short message of the client, wherein the client has indicated that he plans not to attend the upcoming service during said first service interval. The service provider 3 or staff of the service provider 3 may also initiate transmission of the service cancellation message in case the service provider is unable to offer a specific service to the client in the first service interval, e.g. because a certain resource required for the service is unavailable during the first service interval.

Furthermore, the detector 13 may be configured to detect the event that the service scheduling system 1 does not receive, within a predetermined time limit, a service acknowledgement message from the client in response to a service confirmation request message transmitted from the service scheduling system 1 to the client. In other words, still in step S22, the service scheduling system 1 may transmit, e.g. to the communication terminal 3 of the client, the service confirmation request message requesting the client to confirm that he indeed plans to attend the service during the first service interval. Particularly, such a service confirmation request message may be transmitted if the detector 13 has already detected, at the beginning of the first service interval, the absence of the client or the absence of the communication terminal 3 of the client at the premises 23 of the service provider. If the service acknowledgement message is received within the predetermined time limit, the service scheduling system deduces that the client is just delayed but still plans to attend the service in the remaining time of the first service interval.

FIG. 2 shows a situation in which the detector 13 has detected, in step S22, an event indicating that a client cannot be served in the first service interval assigned to said client according to the schedule information. After the detector 13 has detected this event, the service scheduling system 1 may modify the schedule information stored at the service scheduling system 1 accordingly and transmit the schedule information or single information elements of the schedule information to the time-management system 2.

Next, in optional step S23, the service scheduling system 1 may determine a subgroup of communication terminals 3' of those clients to which information specifying the second service interval which is at least partly overlapping the first service interval shall be transmitted.

In step S24, the transmitter may transmit, to a communication terminal 3' of a potential replacement client, information specifying the second service interval which is at least partly overlapping the first service interval. The information for specifying the second service interval is information which is relevant to the potential replacement client for deciding whether to accept the offered service in the second service interval and will be denoted as service offer in the following. This service offer may include e.g., the start time and/or the end time of the second service interval, a description of the service offered, the cost of the service etc. Optionally, the service offer may include some sort of incentive like e.g. a rebate or a bonus for motivating the client to accept the service offer.

Figure 3:
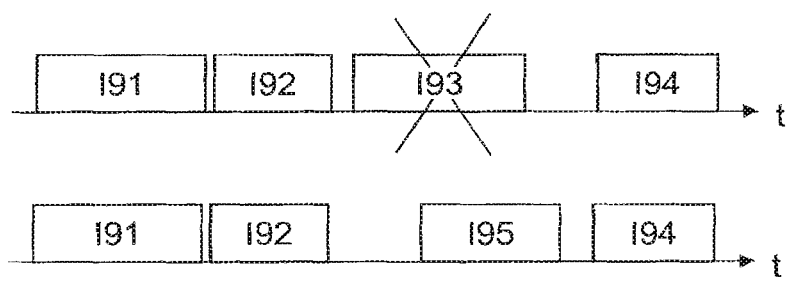
FIG. 3 shows two exemplary sequences of service intervals with partly overlapping service intervals.

FIG. 3 illustrates an example of a second service interval 195 which is partly overlapping a first service interval 193 on the time axis, the time axis being denoted as t. In this example, the client to which the first service interval 193 was assigned does not show up. This non-appearance is detected by the detector 13. In step S24, information for specifying the second service interval 195 may be transmitted to the communication terminal 3' of a possible replacement client. As displayed in FIG. 3, both the start time and the end time of the second service interval may be shifted compared to the first service interval to efficiently utilize the remaining time until the start of a later service interval 194.

In a simple embodiment of the present invention, the service scheduling system 1 may not comprise any software or hardware modules which are located at the communication terminals 3, 3' of the clients. In such a simple embodiment, the client may respond to a service offer transmitted in step 324 by transmitting, in step S25, a pre-determined electronic message to the service scheduling system 1, indicating that the client accepts or rejects the service offer during the second service interval. Such a pre-determined electronic message may be e.g. an e-mail or a short text message (SMS) with a predetermined content such as the letters "yes" or "no". Moreover, pre-determined electronic messages which indicate an acceptance and/or rejection of the client may be described in the service offer transmitted in step S24.

In a more sophisticated embodiment of the present invention, the service scheduling system 1 may comprise a software application running on a communication terminal 3, 3' of a client, wherein the software application is configured to instruct the communication terminal 3, 3' to receive information specifying a service interval, to display the information specifying the service interval via a user interface of the communication terminal 3', and to receive, from the client, via the user interface, acknowledgment information indicating that the client agrees to get served by the service provider in the service interval.

The user interface may be implemented using the capabilities of e.g. a touchscreen display of a smartphone or a mobile computer. Further, the software application may instruct the communication terminal 3, 3' to forward information, which is based on the acknowledgement information received via the user interface, to the client interface 12 of the service scheduling system 1.

As already mentioned, in optional step S23, the service scheduling system 1 may determine a subgroup of communication terminals 3' of the clients to which the service offer, i.e. the information specifying the second service interval which is at least partly overlapping the first service interval, is transmitted in step S24. Obviously, in a straightforward embodiment, the service scheduling system 1 may simply transmit the service offer to the communication terminal 3' of all clients of the service provider. Alternatively, the service offer may be transmitted to only those clients who are assigned an upcoming service interval according to the schedule information, or to those clients who have recently received a particular service. Generally, the clients to which the service offer is transmitted in step S24 may be filtered by an arbitrary criterion.

The service scheduling system 1 may be further configured to receive, from the communication terminal 3' of the client, location information indicating a current location of the further client, and to decide, based on the location information, whether the information specifying the second service interval is transmitted to the communication terminal 3' of the client. The location information may comprise e.g., global positioning system (GPS) data generated at the communication terminal 3'. This way, the service scheduling system 1 may estimate the required travelling time of the client from his current location to the premises 23 of the service provider. Further, it becomes possible that the service scheduling system 1 identifies those clients for whom it is possible to arrive at the premises 23 of the service provider and to receive the service during the second service interval e.g. before the service of a subsequent customer is due (compare service interval 194 in FIG. 3).

Optionally, the service scheduling system 1 may determine the current position of a client based on his home address and/or work address. To this end, the service scheduling system 1 may retrieve the home address and/or work address of the clients from the time-management system 2.

The service scheduling system 1 may be further configured to receive, from the communication terminal 3' of the further client, client schedule information indicating the timely availability of the further client, and to decide, based on the client schedule information, whether the information specifying the second service interval is transmitted to the communication terminal 3' of the further client.

The client schedule information may be structured similarly as the schedule information of the service provider, i.e., the client schedule information may associate time intervals with activities/appointments of the client. In particular, a time-management system including a calendaring software may be installed on the communication terminal 3' of the client and this time-management system may manage the client schedule information. The time-management system may or may not be the same as the time-management system 2 of the service provider.

However, even if the service scheduling system 1 determines based on the client schedule information that a possible replacement client is not available during the second service interval, the service scheduling system 1 may nevertheless transmit the service offer to the client for enabling the client to accept the service offer, to change his personal schedule, and to modify the client schedule information respectively.

In step S24, service offers may be transmitted to the communication terminals 3' of the subgroup of clients determined in step S23. The service offers may be transmitted sequentially or all at the same time. In case all service offers are transmitted simultaneously, after receiving the first acknowledgement information from one client indicating that this client accepts the service offer, the service scheduling system 1 may transmit information to the other communication terminals 3' to revoke the service offers.

After the service scheduling system 1 has received the acknowledgment information from the communication terminal 3' of a client, the service scheduling system 1 may modify the stored schedule information such that the second service interval is assigned to this client. Schedule information which is modified accordingly may be transmitted to the time-management system 2 in step S26. That is, the service scheduling system 1 may be configured to transmit updated schedule information to the time-management system 2 of the service provider, the updated schedule information assigning the second service interval to the further client. In addition, the service scheduling system 1 may transmit a message to the client who was previously assigned to the first service interval, wherein the message indicates that his assignment to the first service interval was cancelled.

Generally, the exemplary process illustrated in FIG. 2 can be considered as an automatic non-appearance replacement process, i.e. a process carried out by the service scheduling system 1 for automatically finding a further client for replacing a client who does not appear at the premises 23 of the service provider. In general, this non-appearance process may be triggered depending on the specific requirements of the service provider. For instance, it may be individually defined for each kind of service e.g. dependent on the length of the service interval and/or dependent of the required resources of the service provider whether the service scheduling system 1 shall automatically initiate the non-appearance process.

Figure 4:
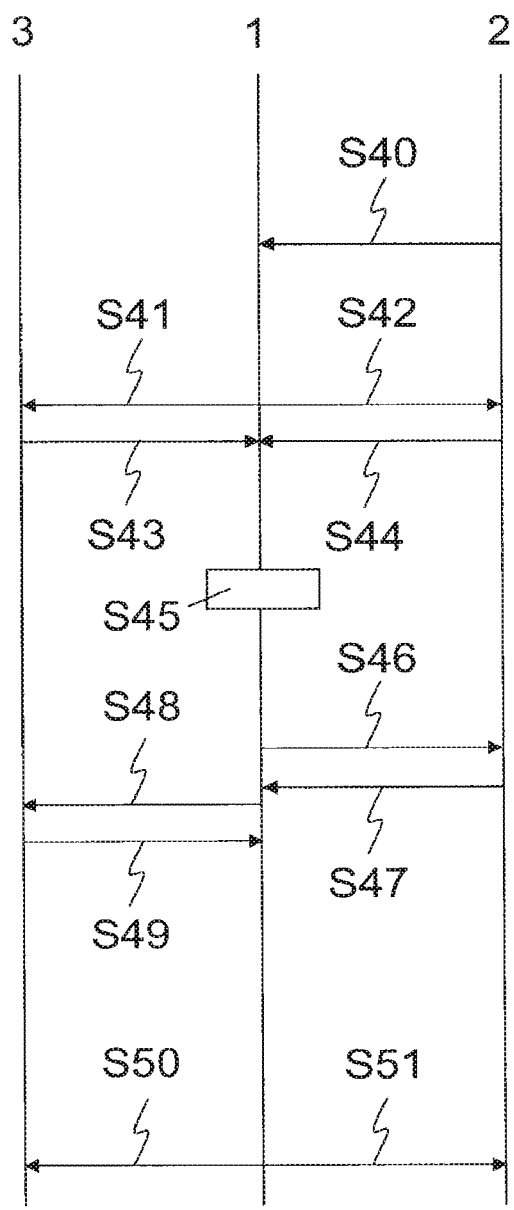
FIG. 4 shows another flow diagram illustrating another exemplary sequence of steps carried out by the service scheduling system.

FIG. 4 shows a flow diagram illustrating another exemplary sequence of steps carried out by the service scheduling system 1. In FIG. 4, it is assumed that a client with a communication terminal 3 wants to arrange a new appointment for a service interval with the service provider. In this exemplary process, the service scheduling system 1 is used to realize a service arrangement process between the service provider and the client by providing an efficient message exchange between both parties.

Specifically, the service scheduling system 1 may be configured to receive, from the communication terminal 3 of the client, client schedule information indicating the timely availability of the client 3 (step S43), to determine a matching service interval which is in accordance with both the schedule information retrieved from the time-management system 2 of the service provider and the client schedule information (step S45), to transmit information specifying the matching service interval to the communication terminal 3 of the client (step S48), and to receive, from the communication terminal 3 of the client, acknowledgment information indicating that the client agrees to get served in the matching service interval (step S49).

The process illustrated in FIG. 4 may be carried out while the client resides at the premises 23 of the service provider e.g., when the client has just finished a service interval and wants to arrange a new appointment for another service interval. The process may be initiated by the service provider or staff of the service provider by manually entering constraints for finding a matching service interval into the time-management system 2. These constraints may include e.g. the length of the service interval, resources required by the service provider, and/or a time limit until which the service interval should be scheduled at the latest.

Some of the above constraints may also be determined automatically by the service scheduling system 1. For example, the service scheduling system 1 may be configured to determine the length of the service interval based on statistical information stored in the service scheduling system 1 or retrieved from an external computer system of the service provider. Optionally, the service scheduling system 1 may retrieve the statistical information from the time-management system 2 of the service provider.

In step S40, the service scheduling system 1 may retrieve the constraints for finding a matching service interval from the time-management system 2 of the service provider.

In step S41, the service scheduling system 1 may transmit a request for client schedule information to the communication terminal 3, and in step S43, the service scheduling system 1 may retrieve the client schedule information. The client schedule information may be managed by a time-management system running on the communication terminal 3, like e.g. a personal information manager (PIM) or any other type of application software that functions as a personal organizer. As already discussed with regard to steps S20 and S21 in FIG. 2, a different procedure for synchronizing the client schedule information stored at the service scheduling system 1 may be applied. In a similar way, the service scheduling system 1 may synchronize the schedule information of the service provider in steps S42 and S44.

In step S45, the service scheduling system 1 determines a matching service interval, taking into account e.g., the given constraints, the schedule information of the service provider and the client schedule information.

In optional step S46, the service scheduling system 1 may transmit information specifying the matching service interval to the time-management system 2 of the service provider before offering the matching service interval to the client in step S48. If the service provider accepts to make an appointment with the client in the matching service interval, the service scheduling system 1 may receive acknowledgment information indicating the service provider's agreement in step S47.

Next, the service scheduling system 1 may transmit information specifying the matching service interval to the communication terminal 3 of the client. In step S49, either a positive or a negative acknowledgement is transmitted from communication terminal 3 to the service scheduling system 1. In the example illustrated in FIG. 4, it is assumed that the client agrees to get served during the service interval proposed by the service scheduling system 1.

Finally, in steps S50 and S51, updated schedule information which assigns the matching service interval to the client may be transmitted to the communication terminal 3 and the time-management system 2, respectively.

Figure 5:
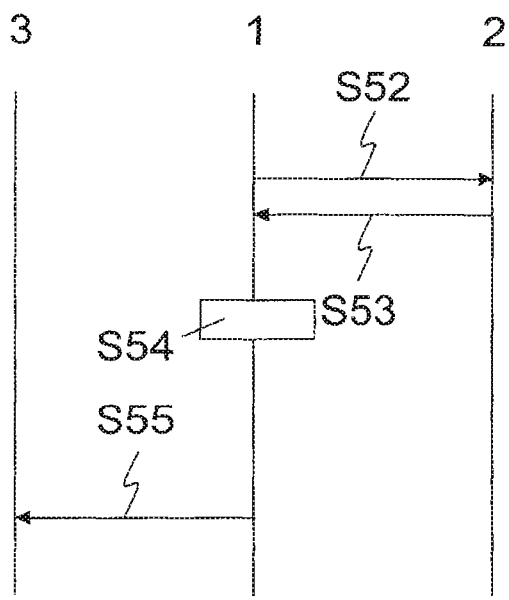
FIG. 5 shows a further flow diagram illustrating a further exemplary sequence of steps carried out by the service scheduling system.

FIG. 5 shows a further flow diagram illustrating an exemplary sequence of steps carried out by a service scheduling system 1. In steps S52 and S53, the service scheduling system 1 may retrieve an update of the schedule information stored at the time-management system 2. Steps S52 and S53 may correspond e.g. to steps S21 and S22 described in the context of FIG. 2.

In step S54, the service scheduling system 1 may retrieve real-time information collected at the premises 23 of the service provider and may determine estimated schedule information based on the real-time information. Moreover, the service scheduling system 1 may be configured to transmit, to a communication terminal 3 of a client, an estimated start time of a service interval assigned to the client in step S55.

The real-time information may be collected by e.g. the client sensors 22 or other sensor's integrated in the service provider's equipment. In particular, as described with regard to FIG. 2, the client sensors 22 may comprise e.g. video cameras, weight sensors, contact sensors, or a wireless receiver for monitoring the client at the premises 22 of the service provider. The real-time information includes e.g. information about the progress of the service during service intervals which are scheduled before the relevant service interval of the client.

Preferably, steps S52 to S55 are repeated at high frequency. The estimated start time of a service interval may be displayed at the client's communication terminal 3, e.g. by the user interface of the software application of the service scheduling system 1. Like this, it becomes possible to inform the client about a possible delay or time shift and to minimize waiting times at the service provider.

In addition, the service scheduling system 1 may be configured to determine the start time of the service interval assigned to the client based on information related to the service provider and the employees of the service provider. For example, the service scheduling system 1 may take into account how many employees of the service provider are available at a specific day or time or whether an employee is sick. Moreover, the service scheduling system 1 may take into account the availability of the service provider's equipment, like e.g. a defect dentist chair.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A service scheduling system configured to retrieve schedule information from a time-management system of a service provider, the schedule information assigning service intervals offered by the service provider to a plurality of clients, the service scheduling system comprising:
   a sensor configured to automatically detect a physical presence of a client on premises of the service provider by electronically measuring a physical quantity of the client, and
   a processor configured to, in response to the physical presence of the client not being detected on the premises of the service provider within a predetermined amount of time from a beginning of the first service interval,
   identify a further client that can arrive at the service provider in time to be served during a second service interval which is at least partly overlapping with the first service interval, the identification being based on a GPS location information of the further client and an estimated travel time to the service provider,
   in response to the sensor detecting that the client cannot be served based on real-time information of the premises of the service provider collected by the sensor, receive, from a communication terminal of the further client, client schedule information indicating the timely availability of the further client,
   transmit, to the communication terminal of the further client, information specifying the second service interval, and
   receive, from the communication terminal of the further client, acknowledgment information indicating that the further client agrees to get served in the second service interval.

2. The service scheduling system according to claim 1, wherein the processor of the service scheduling system is configured to transmit updated schedule information to the time-management system of the service provider, the updated schedule information assigning the second service interval to the further client.

3. The service scheduling system according to claim 2, wherein the detector is configured to detect an event that the service scheduling system receives a service cancellation message.

4. The service scheduling system according to claim 2, wherein the detector is configured to detect that the service scheduling system does not receive, within a predetermined time limit, a service acknowledgement message from the client in response to a service confirmation request message transmitted from the service scheduling system to the client.

5. The service scheduling system according to claim 1, wherein the processor of the service scheduling system is further configured
   to receive, from the communication terminal of the further client, location information indicating a current location of the further client, and
   to decide, based on the location information, whether the information specifying the second service interval is transmitted to the communication terminal of the further client.

6. The service scheduling system according to claim 1, wherein the processor of the service scheduling system is further configured
   to receive, from the communication terminal of the further client, client schedule information indicating the timely availability of the further client, and
   to decide, based on the client schedule information, whether the information specifying the second service interval is transmitted to the communication terminal of the further client.

7. The service scheduling system according to claim 1, wherein the processor of the service scheduling system is configured
   to determine a matching service interval which is in accordance with both the schedule information retrieved from the time-management system of the service provider and the client schedule information,
   to transmit information specifying the matching service interval to the communication terminal of the client, and
   to receive, from the communication terminal of the client, acknowledgment information indicating that the client agrees to get served in the matching service interval.

8. The service scheduling system according to claim 1, wherein the processor of the service scheduling system is configured
   to retrieve the real-time information collected at the premises of the service provider,
   to determine estimated schedule information based on the real-time information, and
   to transmit, to a communication terminal of a client, an estimated start time of a service interval assigned to the client.

9. The service scheduling system according to claim 1, wherein the service scheduling system further comprises a software application running on a communication terminal of a client, wherein the software application is configured to instruct the communication terminal
   to receive information specifying a service interval, to display the information specifying the service interval via a user interface of the communication terminal, and
   to receive, from the client, via the user interface, acknowledgment information indicating that the client agrees to get served by the service provider in the service interval.

10. A service scheduling method comprising:
    retrieving, from a time-management system of a service provider, schedule information assigning service intervals offered by the service provider to a plurality of clients;
    automatically detecting a physical presence of a client on premises of the service provider by electronically measuring a physical quantity of the client; and
    in response to the physical presence of the client not being detected on the premises of the service provider within a predetermined amount of time from a beginning of the first service interval,
       identifying a further client that can arrive at the service provider in time to be served during a second service interval which is at least partly overlapping with the first service interval, the identification being based on a GPS location information of the further client and an estimated travel time to the service provider;
       in response to the sensor detecting that the client cannot be served based on real-time information of the premises of the service provider collected by the sensor, receiving, from a communication terminal of the further client, client schedule information indicating the timely availability of the further client;
       transmitting, to the communication terminal of the further client, information specifying the second service interval, and
       receiving, from the communication terminal of the further client, acknowledgment information indicating that the further client agrees to get served in the second service interval.

11. A non-transitory computer-readable storage medium storing computer-readable instructions thereon, the instructions, when executed by one or more processors of a service scheduling system, cause the service scheduling system to perform a method comprising:
    retrieving, from a time-management system of a service provider, schedule information assigning service intervals offered by the service provider to a plurality of clients;
    automatically detecting a physical presence of a client on premises of the service provider by electronically measuring a physical quantity of the client;
    in response to the physical presence of the client not being detected on the premises of the service provider within a predetermined amount of time from a beginning of the first service interval,
       identifying a further client that can arrive at the service provider in time to be served during a second service interval which is at least partly overlapping with the first service interval, the identification being based on a GPS location information of the further client and an estimated travel time to the service provider;
       in response to the sensor detecting that the client cannot be served based on real-time information of the premises of the service provider collected by the sensor, receiving, from a communication terminal of the further client, client schedule information indicating the timely availability of the further client;
       transmitting, to the communication terminal of the further client, information specifying the second service interval; and receiving, from the communication terminal of the further client, acknowledgment information indicating that the further client agrees to get served in the second service interval.

* * * * *